United States Patent Office 2,874,156
Patented Feb. 17, 1959

2,874,156

SUBSTITUTED 2,3-DIPHENYL-1,4-DIOXO-TETRA-HYDROPHTHALAZINES AND A PROCESS FOR PREPARING THEM

Heinrich Ruschig, Bad Soden, Taunus, and Robert Fugmann, Hans Eggert, Ernst Fischer, and Ernst Lindner, Frankfurt am Main, Germany, assignors to Farbwerke Hoechst Aktiengesellschaft vormals Meister Lucius & Bruning, Frankfurt, Germany, a corporation of Germany No Drawing. Application August 2, 1955
Serial No. 526,072

Claims priority, application Germany August 7, 1954

7 Claims. (Cl. 260—250)

The present invention relates to tetrahydrophthalazines of the formula

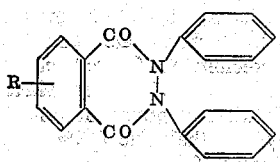

wherein R represents a free, an alkylated or an acylated hydroxyl or amino group, as well as to their salts and a process for preparing the above-mentioned compounds.

Substances showing a strong narcotic effect are of an extraordinary therapeutic importance, the number of the effective substance groups, however, being small. For many years the barbiturates have predominated, although they are rather dangerous and their administration must be carefully controlled.

Now we have found that 2,3-diphenyl-1,4-dioxo-tetrahydrophthalazines substituted in the phthalic acid radical show a strong narcotic effect. The compounds are obtained by condensing phthalic chlorides or phthalic anhydrides once or several times substituted by nitro-groups, hydroxy-groups or acylamino groups, in an anhydrous medium and in the presence of tertiary amines, by means of hydrazobenzene. According to the invention, nitro groups eventually present in the condensation products are reduced to amino groups. Acylamino groups eventually present are likewise hydrolized to amino groups. Amino alkyl radicals can be introduced into the amino groups and/or into hydroxy groups eventually present. The amino groups and/or hydroxy groups can also be acylated and, in this manner, compounds are obtained which are readily soluble in water or oil and well adapted for parenteral or oral application.

There enter into consideration, for instance, the following substituted phthalic chlorides or phthalic anhydrides: 3-nitro- or 4-nitro-phthalic chloride, 4-hydroxy- or 3-hydroxy phthalic anhydride.

The condensation with hydrazobenzene is carried out in the presence of tertiary amines, such as pyridine, or dimethylaniline. When phthalic chlorides are used, these amines simultaneously serve as hydrogen halide acceptor. It is of advantage to carry out the reaction in inert solvents or distributing agents such as benzene, or toluene. If need be, the tertiary amines can also be used as solvents or distributing agents. The reaction can be performed at the ordinary or at an elevated temperature.

In order to obtain the condensation products, the reaction mixture, eventually after concentration under reduced pressure, is acidified, advantageously by means of mineral acids. In many cases the condensation products are thereby obtained in a crystalline structure. The reduction of eventually present nitro groups is suitably effected by means of hydrogen in the presence of Raney nickel; it can, however, also be effected according to other usual methods, for instance by means of tin and hydrochloric acid. The hydrolysis of the condensation products containing acyl-amino groups can be carried out in the usual manner. The phthalazine derivatives thus obtained, i. e. the amino- or hydroxy-2,3-diphenyl-1,4-dioxo-tetrahydrophthalazines are yellowish substances sparingly soluble in water.

They can be transformed into water soluble substances by basic alkylation, for instance by means of diethylamino-ethyl-chloride, piperidino-ethyl-chloride, morpholino-ethyl-chloride, methyl-amino-ethyl-chloride.

In order to obtain the acyl derivatives soluble in water it is possible to react the phthalazines, eventually in the form of their alkali metal compounds, with acid halides containing a tertiary or a quaternary nitrogen atom, or their salts, with eventual quaternation of a tertiary nitrogen atom present in the compounds obtained. The acylation can likewise be carried out in two stages by reaction with a halogenacylhalide and a subsequent reaction with a secondary or a tertiary amine and by converting the basic esters obtained into salts with inorganic or organic acids, such as hydrochloric acid, sulfuric acid, nitric acid, acetic acid, lactic acid, or maleic acid.

Acyl derivatives soluble in oil can be prepared by reacting substituted phthalazines, eventually in the form of their alkali metal compounds, with saturated or unsaturated, non-substituted fatty acid halides.

As starting materials there are used, on the one hand, the afore-mentioned 2,3-diphenyl-1,4-dioxo-tetrahydrophthalazines containing hydroxy or amino groups, on the other hand acid halides, which, for instance, can be prepared as follows:

It is possible, for instance, to convert betaine hydrochloride by means of thionyl chloride into N-chloro-betainyl-chloride, according to U. S. Patent No. 2,359,863. Chlorides of quaternary carbonic acid esters, for instance, can be produced, according to J. Chem. Soc., London (1947), page 179, by quaternation of ethylene chlorohydrine with triethyl amine and reaction of the quaternary alcohol obtained with phosgene. According to J. Am. Chem. Soc. (1953), page 6364, pyridine carboxylic acid chlorides can be obtained, for instance by reaction of pyridine-carboxylic acid salts, for instance of potassium salt of nicotinic-acid with oxalyl chloride. According to German Patent No. 629,054,, for example, compounds of the type of the dialkylamino acetic acid chloride-hydrochloride can be obtained from diethylamino-acetic acid hydrochloride by means of thionyl chloride. According to J. Am. Chem. Soc. 72 (1950), page 2299, acrylic acid chloride can easily be obtained by reacting acrylic acid with benzoyl chloride. Oleic acid chloride and stearic acid chloride are readily accessible from the carboxylic acids by the action of thionyl chloride.

There will be mentioned, for instance, the following acid halides which enter into consideration as starting materials for the process according to the invention:

N-chloro-betainyl-chloride, bromo-acetyl bromide, chloro-acetyl chloride, chloro-formic acid-($\beta$-diethylamino-ethyl)-ester-chloro-ethylate, chloro-formic acid-($\beta$-dimethylamino-ethyl)-ester-chloromethylate, nicotinic acid chloride, diethylamino-acetyl-chloride-hydrochloride, acrylic acid chloride, oleic acid chloride, or stearic acid chloride.

The process can be realized, for instance, in the following manner: It is possible to react the 2,3-diphenyl-1,4-dioxo-tetrahydrophthalazines containing hydroxy or amino groups with the said acid halides at room temperature as well as at a moderately elevated temperature. Particularly when crystalline acid halides are used, it is advisable to operate in the presence of solvents and distributing agents, for instance aromatic hydrocarbons such as benzene, toluene, xylene, or halogenated hydrocarbons such as chlorobenzene, methylene chloride, or chloroform. It is advantageous also to add a tertiary base such as pyridine or dimethylaniline as acid binding agent. In the last-mentioned case the presence of a further solvent or distributing agent is superfluous.

The acylation can also be carried out in such a way as to react the alkali metal compounds of the phthalazines with the above-named acid halides in the presence or absence of one of the afore-mentioned inert solvents or distributing agents.

Acid halides which, in the alkyl chain, carry a quaternary nitrogen atom, can be used already as starting substances. However, it is also possible to carry out the reaction with monohalo acid halides and to convert, by means of trialkylamines, the halogenated esters obtained into quaternary ammonium compounds or, by means of dialkylamines, into basic esters with a tertiary nitrogen atom. Finally, the reaction can also be carried out by means of tertiary amino carboxylic acid halides, eventually in the form of the corresponding salts, and the basic esters obtained can eventually be quaternized by means of esters of low aliphatic alcohols and strong mineral acids. The quaternation can be carried out at normal temperature as well as at a slightly elevated temperature and in the presence or absence of one of the inert solvents and distributing agents already mentioned or a surplus of the quaternation reagent which, in such a case, simultaneously serves as a solvent.

The compounds obtainable according to the process of the present invention are to be used as medicaments, particularly as orally and parenterally applicable narcotics. In contradistinction to the barbiturates, the substances are characterized by a stronger narcotic effect, as this results from the following table:

(1927), page 73). In comparison with the known products, which, according to what we found out, also possess sedative effects, the compounds obtained according to the present invention, as far as they contain amino- or hydroxy-groups in the phthalic acid radical, show a broader therapeutic field of application. After the basic alkylation or acylation the compounds obtained according to the invention are, as salts, soluble in water or oil and are of a good therapeutic efficiency.

The following examples serve to illustrate the invention but they are not intended to limit it thereto:

EXAMPLE 1

*6-amino-2,3-diphenyl-1,4-dioxo-tetrahydrophthalazine*

200 grams of 4-nitrophthalyl-chloride (0.806 mol) are slowly added dropwise, while stirring, to a suspension of 147 grams of hydrazobenzene (0.806 mol) in 300 cc. of dry dimethylaniline. During the reaction the mixture is diluted by 1.2 liters of absolute benzene, so that it can still be stirred. The temperature rises to 60° C.–70° C. Finally, the mixture is still heated for 2 hours to 100° C. (internal temperature). After cooling the reaction mixture is stirred into a mixture of 500 cc. of concentrated hydrochloric acid and 3 liters of water. The amorphous precipitate is filtered with suction, washed with water and triturated with ether, whereby crystallization sets in. Yield: 200 grams of 6-nitro-2,3-diphenyl-1,4-dioxo-tetrahydrophthalazine (69% of the theoretical yield); melting point 189°–191° C.

The same compound can equally be prepared as follows: 92 grams of hydrazobenzene (0.5 mol) are stirred into a solution of 96.5 grams of 4-nitrophthalic anhydride (0.5 mol) in 350 cc. of absolute pyridine. The mixture is heated for 3 hours to an internal temperature

| Substance | Animal | Effective dose, Kg. |
| --- | --- | --- |
| 5-(β-bromoallyl)-5 secondary butyl-barbiturate | Rabbit<br>Mouse | 50 milligrams intravenously.<br>Do. |
| 6-amino-2,3-diphenyl-1,4-dioxotetrahydrophthalazine | Rabbit | 2 milligrams intravenously. |
| 5-amino-2,3-diphenyl-1,4-dioxo-tetrahydrophthalazine | Mouse | 10 milligrams intravenously. |
| 6-hydroxy-2,3-diphenyl-1,4-dioxotetrahydrophthalazine | Mouse<br>Rabbit | 30 milligrams intravenously.<br>20 milligrams intravenously. |
| 5-hydroxy-2,3-diphenyl-1,4-dioxotetrahydrophthalazine | Mouse<br>Rabbit | 2 milligrams intravenously.<br>Do. |
| 5-dimethylamino-acetoxy-2,3-diphenyl-1,4-dioxo-tetrahydrophthalazine-chloromethylate. | Rat<br>Rabbit | 7.5 milligrams intravenously.<br>1.75 milligrams/minute when permanently infused. |
| 5-nicotinoyloxy-2,3-diphenyl-1,4-dioxo-tetrahydrophthalazine-bromoethylate. | Rat<br>Rabbit<br>Dog | 10 milligrams intravenously.<br>Do.<br>15 milligrams intravenously. |
| [2,3-diphenyl-1,4-dioxo-tetrahydrophthalazinyl-(5)]<br>[β-diethylamino-ethyl]-carbonate ethyl-nitrate | Mouse | 20 milligrams intravenously. |

Moreover, when compared with the barbiturate, taken for comparison, the depth of the narcosis is reduced. According to the dose administered, the duration of the narcosis varies between 15 and 30 minutes.

As regards the acyl derivatives soluble in water, those deriving from 5-hydroxy- or 6-hydroxy-2,3-diphenyl-1,4-dioxo-tetrahydrophthalazine are especially readily and rapidly cleavable at the phenol-ester linkage already under physiological conditions, whereby the 2,3-diphenyl-1,4-dioxo-tetrahydrophthalazines containing hydroxy groups are set free in a highly dispersed and easily reabsorbing manner. In the case of parenteral application, especially when halogen alkylates of the 5- or 6-dialkylamino-acetoxy-2,3-diphenyl-1,4-dioxo-tetrahydrophthalazine are used during operations, a special advantage is represented by the fact that they are of a strong curare effect which diminishes in the same extent as the hydrolytic cleavage progresses. Thus, it is possible by means of a permanent infusion continuously to control the degree of the curarization at the sleeping animal.

It is already known to condense phthalic chloride in the presence of dimethylaniline by means of hydrazobenzene or hydrazotoluene, whereby dioxotetrahydrophthalazines are likewise obtained (Angew. Chemie 40 of 100° C. Then, the major part of the pyridine is filtered with suction under reduced pressure. The oily residue is poured into 2 N-hydrochloric acid. The precipitate is repeatedly washed by means of 2 N-hydrochloric acid, dried and recrystallized from methanol; melting point 189–191° C. 200 grams of 6-nitro-2,3-diphenyl-1,4-dioxo-tetrahydrophthalazine are suspended in 1.5 liters of methanol and hydrogenated in the presence of Raney nickel. The theoretical amount of hydrogen is thereby absorbed. After separation of the catalyst, the mixture is evaporated and recrystallized from ethyl acetate. 6-amino-2,3-diphenyl-1,4-dioxo-tetrahydrophthalazine is obtained; melting point 238°–240° C.

EXAMPLE 2

*5-amino-2,3-diphenyl-1,4-dioxo-tetrahydrophthalazine*

1.7 liters of absolute benzene are filled into a three-necked flask of 6 liters capacity. Then are simultaneously added, while vigorously stirring, a suspension of 490 grams of hydrazobenzene (2.69 mol) in 1 liter of dry dimethylaniline and a solution of 660 grams of 3-nitrophthalyl-chloride (2.69 mol) in 2 liters of absolute benzene, which operation takes about 1 hour. The temperature is maintained at 40°–45° C. by cooling. Subsequently, the mass is further reacted for 24 hours at room temperature, under stirring. For its further treatment it is poured into 2 N-hydrochloric acid, the resulting precipitate is strongly filtered with suction and recrystallized from glacial acetic acid. Yield: 770 grams of 5-nitro-2,3-diphenyl-1,4-dioxo-tetrahydrophathalazine (81% of the theoretical yield); melting point 250°–254° C.

240 grams of the nitro compound are suspended in 1.4 liters of methanol and hydrogenated in the presence of Raney nickel. When the absorption of hydrogen is finished, the reaction product crystallized out is again brought into dissolution by adding methanol. It is filtered with suction from the catalyst, concentrated and caused to crystallize out. 5-amino-2,3-diphenyl-1,4-dioxo-tetrahydrophthalazine is obtained melting at 190°–192° C.

EXAMPLE 3

*5-(β-diethylamino-ethylamino)-2,3-diphenyl-1,4-dioxo-tetrahydrophthalazine*

32.9 grams (0.1 mol) of 5-amino-2,3-diphenyl-1,4-dioxo-tetrahydrophthalazine (obtained according to the process of Example 2) and 50 grams of diethylamino-ethyl-chloride (0.37 mol) are heated to 150° C. for 3 hours in the sealed tube. Then, the reaction mass is comminuted and extracted by means of 0.4-N-hydrochloric acid. The filtered solution is rendered alkaline by means of potassium carbonate and extracted with ether. The united ether extracts are dried with sodium sulfate. The hydrochloride of the base is precipitated by means of absolute ethereal hydrochloric acid and recrystallized from absolute alcohol; melting point 251°–253° C.

EXAMPLE 4

*6-hydroxy-2,3-diphenyl-1,4-dioxo-tetrahydrophthalazine*

16.4 grams of 4-hydroxy-phthalic acid anhydride (0.1 mol) and 18.4 grams of hydrazobenzene (0.1 mol) are dissolved in 280 cc. of absolute pyridine and heated to 110° C. (internal temperature) under reflux for 10 hours. The mass is then poured into 2 N-hydrochloric acid. The precipitate set free is filtered with suction, dried and recrystallized from methanol; melting point 260°–270° C. After a second crystallization the melting point reaches 268°–270° C.

EXAMPLE 5

*6-(β-diethylamino-ethoxy)-2,3-diphenyl-1,4-dioxo-tetrahydrophthalazine*

2.9 cc. of an absolute alcoholic 0.9 3 N-sodium ethylate solution are dropwise introduced, while stirring, into a suspension of 900 milligrams of 6-hydroxy-2,3-diphenyl-1,4-dioxo-tetrahydrophthalazine (obtained according to the process of Example 4) of a melting point of 260°–270° C. (0.00272 mol) in 40 cc. of absolute toluene. After adding 0.51 gram of diethylaminoethyl chloride in an absolute alcoholic solution of 10% strength (0.00378 mol) the mass is heated for 8 hours under reflux, while stirring, on the oil bath (temperature of the bath 100° C.). Then it is evaporated under reduced pressure, taken up in water and ether and shaken out with 1 N-hydrochloric acid. The acid extracts are rendered alkaline by means of potassium carbonate and then shaken out with ether. The ether solution of the base is washed with water, dried with sodium sulfate and concentrated by vaporization. After crystallizing twice from a mixture of benzene and petroleum ether the residue melts at 120°–121° C.

EXAMPLE 6

*5-hydroxy-2,3-diphenyl-1,4-dioxo-tetrahydrophthalazine*

16.4 grams of 3-hydroxy-phthalic anhydride (0.1 mol) and 18.4 grams of hydrazobenzene (0.1 mol) are dissolved in 100 cc. of absolute pyridine and heated for 7 hours under reflux to 100° C. (internal temperature). Then the mass is evaporated under reduced pressure. The residue is washed with dilute hydrochloric acid and recrystallized from methanol. Melting point 188°–189° C.

EXAMPLE 7

*5-dimethylaminoacetoxy-2,3-diphenyl-1,4-dioxo-tetrahydrophthalazine chloromethylate*

24.6 grams of 5-hydroxy-2,3-diphenyl-1,4-dioxo-tetrahydrophthalazine (0.0744 mol) are dissolved in 124 cc. of absolute pyridine, and 20 grams of N-chloro-betainyl-chloride (0.116 mol) pulverized in the absence of moisture are rapidly added while vigorously stirring. The temperature rises to 28°–30° C. The mass is stirred for 8 hours in the absence of moisture at room temperature, and the pyridine is distilled off at an essentially reduced pressure at a bath temperature of 30°–35° C. The residue from distillation is dissolved in 500 cc. of dry methylene chloride agitated with 10 grams of animal charcoal, filtered, concentrated to 250 cc. and precipitated with 750 cc. of absolute benzene. The solution is decanted from the dark brown, viscous precipitate, which, on standing for a prolonged time, completely crystallizes. It is dissolved in the hot in 600 cc. of isopropyl alcohol, 10 grams of animal charcoal are added, the mass is shaken for some minutes, filtered and concentrated to 100–150 cc. under reduced pressure. 24 grams of a quaternary salt are crystallized out which can be obtained in a pure state when crystallized repeatedly from isopropyl alcohol. Yield: 22 grams. After the evaporation and the washing with a little methanol (20 cc.), the methylene-chloride-benzene mother liquors obtained during the above decantation yield again 4 grams of 5-hydroxy - 2,3 - diphenyl - 1,4 - dioxo - tetrahydrophthalazine in pure state. The yield, referring to reacted 5-hydroxy-2,3-diphenyl-1,4-dioxo-tetrahydro-phthalazine, amounts to 76% of the theoretical yield.

Sometimes the quaternary salt already crystallizes from the reaction mixture. After a reaction period of 8 hours, it is advisable to filter the crystallization product with suction, to purify it in the manner described above by means of methylene chloride and animal charcoal and by crystallization from isopropyl alcohol. The resulting pyridine mother liquors are suitably worked up in order to obtain 5-hydroxy-2,3-diphenyl-1,4-dioxo-tetrahydrophthalazine by evaporation under reduced pressure, taken up in water and addition of a sodium carbonate solution until a strong alkaline reaction is produced. The aqueous alkaline suspension is allowed to stand for 20 minutes, then acidified and filtered with suction. After washing with 20 cc. of methanol the phthalazinephenol used as starting material is recovered in the pure state.

In the air the quaternary salt rapidly absorbs water of crystallization. According to the conditions of prevailing atmospheric moisture, the water content varies between 2.5 and 3 mols of water of crystallization. At a relative humidity of 50% it amounts to 2¾ mols. The substance decomposes at 163°–165° C. with evolution of gas.

EXAMPLE 8

*5-diethylaminoacetoxy-2,3-diphenyl-1,4-dioxo-tetrahydrophthalazine-bromoethylate*

A suspension of 51.4 grams of the sodium salt of 5-hydroxy-2,6-diphenyl-1,4 - dioxo - tetrahydrophthalazine (0.146 mol) is added while stirring to a solution of 29.5 grams (0.146 mol) of bromo-acetal-bromide in 300 cc. of absolute toluene. Thereby a moderate heating occurs. Subsequently the mixture is heated under reflux for 1 hour and, in the hot state, filtered with suction from the sodium chloride precipitated. During the cooling of the reaction mixture 26 grams of bromo-acetic-acid ester crystallize out, having a melting point of 185°–189° C. After concentration of the mother liquors a further 18.4 grams of the same melting point are obtained (68% of the theoretical yield).

5 grams of the bromo-acetyl-derivative are heated in the sealing tube for 20 hours to about 100° C. together with 30 cc. of absolute triethylamine. Then the triethylamine is removed by distillation and the reaction product is dried in the desiccator over sulfuric acid. The residue is triturated by means of 200 cc. of water. The suspension is rapidly sucked through a filter. The filtrate is submitted to lyophilization. The dry residue is dissolved in the cold in acetone. The solution is filtered, concentrated under reduced pressure and allowed to stand for crystallization. A crystallized quaternary salt is obtained having a decomposition point of 166°–168° C. (evolution of gas).

The sodium salt of the 5-hydroxy-2,3-diphenyl-1,4-dioxo-tetrahydrophthalazine used as starting material is prepared as follows: 33.03 grams of the hydroxy-compound (1/10 mol) are dissolved in a mixture of 200 cc. of absolute methanol and 100 cc. 1 N-absolute methyl-alcoholic sodium methylate solution and evaporated nearly to dryness under reduced pressure, at a temperature of the water bath of 40°–50° C. The residue is suspended in 200 cc. of absolute toluene, and the toluene is distilled off on the water bath at 40–50° C. in the vacuum. Finally, the salt residue is dried at 56° C. under reduced pressure. The sodium compound is sensitive against moisture and carbonic acid of the air. The yield is quantitative.

The sodium salt of the 6-hydroxy derivative is obtained in an analogous manner.

EXAMPLE 9

[2,3-diphenyl-1,4-dioxo-tetrahydrophthalazinyl-(5)]-[β-diethylaminoethyl]-carbonate-ethylnitrate 105.6 grams of the sodium salt of 5-hydroxy-2,3-diphenyl-1,4-dioxo-tetrahydrophthalazine (0.3 mol) are suspended in 700 cc. of dry methylene chloride. While stirring, a solution of 73.2 grams (0.3 mol) of chloroformic acid-(β-diethylaminoethyl)-ester - chloroethylate in 500 cc. of dry methylene chloride is added, whereby the temperature rises by 10° C. and the suspension becomes nearly clear. After stirring for several hours, the mass is filtered with suction, and the filtrate is concentrated by evaporation. The crystallized residue is extracted twice with 500 cc. of water each time and sucked through a filter. The remaining insoluble portions consist of pure 5-hydroxy-2,3-diphenyl-1,4-dioxo-tetrahydrophthalazine (74 grams). In order to split off the sparingly soluble iodide, the filtrate is diluted by means of a solution of 85 grams of potassium iodide in 120 grams of water. The amorphous yellow iodide is thoroughly washed with water and dried over phosphorous pentoxide. Yield: 32.7 grams. (74% of the theoretical yield referred to reacted 5-hydroxy-2,3-diphenyl-1,4-dioxo-tetrahydrophthalazine.)

The iodide is dissolved in 200 cc. of ethyl alcohol of 96% strength and mixed with 50.1 cc. of 0.99206 N-silver nitrate solution (i. e. with the quantity calculated for the iodide content of 19.29% ascertained by analysis). Then the silver iodide is filtered with suction. The filtrate does not contain any silver- or iodine ions. The solution is concentrated by lyophilization. The nitrate obtained contains 1 mol of crystal water and decomposes at 150° C. under evolution of gas.

EXAMPLE 10

[2,3-diphenyl-1,4-dioxo-tetrahydrophthalazinyl (5)]-[β-dimethylaminoethyl]-carbonate-methiodide To a suspension of 35.2 grams of sodium salt of 5-hydroxy-2,3-diphenyl - 1,4 - dioxo - tetrahydrophthalazine (0.1 mol) in 500 cc. of dry methylene chloride there is added, while stirring a suspension of 20 grams of finely triturated chloro - formic-acid-(β - dimethyl-aminoethyl)-ester-chloromethylate in 250 cc. of dry methylene chloride. After a reaction period of 3 days at room temperature the mass is filtered with suction. The filtrate is concentrated to dryness by evaporation under reduced pressure. The residue is extracted with 120 cc. of water. When filtering with suction there are recovered from the aqueous suspension a residue of 23 grams of 5-hydroxy-2,3-diphenyl-1,4-dioxo-tetrahydrophthalazine and a clear filtrate, which is submitted to lyophilization. The dry residue is dissolved in 50 cc. of water and precipitated with excess potassium iodide solution of 30%. The sparingly soluble iodide is washed with water and dried in the high vacuum at 56° C. Yield 10 grams (66% of the theoretical yield referred to reacted 5-hydroxy-2,3-diphenyl-1,4-dioxo-tetrahydrophthalazine).

EXAMPLE 11

6-nicotinoyloxy-2,3-diphenyl-1,4-dioxo-tetrahydrophthalazine 70.4 grams of the sodium compound of 6-hydroxy-2,3-diphenyl-1,4-dioxo-tetrahydrophthalazine (0.2 mol) (obtained according to the directions given in Example 2) in 500 cc. of absolute toluene with 31 grams (0.22 mol) of nicotinic acid chloride are heated under reflux, for 1½ hours. Subsequently the hot mass is filtered and cooled. Thereby 56.5 grams of the pure nicotinic acid ester having a melting point of 169–171° C. (65.0% of the theoretical yield) crystallize out. Further crystalline fractions can be obtained from the mother liquors.

EXAMPLE 12

5 - nicotinoyloxy - 2,3 - diphenyl - 1,4 - dioxo - tetrahydrophthalazine methiodide (a) A solution of 28.2 grams (0.2 mol) of nicotinic acid chloride in 100 cc. absolute toluene are poured, while stirring, into a suspension of 70.4 grams of the sodium salt of 5-hydroxy-2,3-diphenyl-1,4-dioxo-tetrahydrophthalazine (0.2 mol) in 500 cc. of absolute toluene. After a three hours' boiling under reflux the hot mass is filtered with suction from the precipitated sodium chloride and concentrated under reduced pressure. 62 grams of the ester having a smelting point of 187–190° C. crystallize out. By concentrating the mother liquor 10 grams were obtained in addition. Yield: 83% of the theoretical yield.

(b) A mixture of 35.2 grams of the sodium compound of 5 - hydroxy - 2,3 - diphenyl - 1,4 - dioxo - tetrahydrophthalazine, 400 cc. of dry chlorobenzene and 14.1 grams (0.1 mol) of nicotinic acid chloride are heated for half an hour to 100° C. The hot mass is sucked through a glass filter and concentrated. Yield: 20 grams of ester having a melting point of 184°–189° C. (46% of the theoretical yield).

(c) 14.2 grams of nicotinic acid chloride are dissolved in 250 cc. of absolute pyridine. After the reaction heat diminishes 33 grams of 5-hydroxy-2,3-diphenyl-1,4-dioxotetrahydrophthalazine are added to the solution, whereby a temperature rise of 10° C. occurs. The reaction mixture is heated for 1½ hours in the absence of moisture over the steam bath, then evaporated to dryness, and the residue is crystallized from absolute toluene. Yield: 30 grams (69% of the theoretical yield), melting point 185°–188° C.

8.05 grams (0.0185 mol) of the nicotinic acid ester obtained according to (a), (b) or (c) are heated together with 2.7 grams (5% of surplus) of methyl iodide and 25 cc. of absolute toluene in the sealed tube for 10 hours to 150° C. After cooling the crystallization product is filtered with suction, boiled out with absolute benzene, again filtered with suction and dried. Yield: 8.7 grams of a crude product (81.5% of the theoretical yield). After the crystallization from hot water the yellow iodide melts at 245°–250° C. (with decomposition).

EXAMPLE 13

5 - nicotinoyloxy - 2,3 - diphenyl - 1,4 - dioxo - tetrahydrophthalazine-methyl-methylsulfate 2.9 grams of dimethylsulfate (0.073 mol) are added drop by drop to a solution of 10 grams of 5-nicotinoyloxy - 2,3 - diphenyl - 1,4 - dioxo - tetrahydrophthalazine (0.023 mol), obtained according to the directions given in Example 12, in 500 cc. of absolute xylene, while stirring and at a temperature of 130° C. An immediate turbidity sets in. After stirring for 3 hours at 130° C. the mass is allowed to cool, whereby crystallization sets in. The crystallization product is filtered with suction, washed with absolute benzene and dried at 100° C. under highly reduced pressure. The yield in pure methylsulfate amounts to 9.73 grams (75% of the theoretical yield). Melting point 225°–228° C.

EXAMPLE 14

*5 - nicotinoyloxy - 2,3 - diphenyl - 1,4 - dioxo - tetrahydrophthalazine-bromoethylate*

2 grams of 5-nicotinoyloxy-2,3-diphenyl-1,4-dioxotetrahydrophthalazine (obtained according to the direction given in Example 12) are dissolved in 25 cc. of distilled ethylbromide and allowed to stand at room temperature for 2 days in the sealed tube. Thereby a small amount of crystalline substance is precipitated consisting of the quaternary salt. The reaction can be achieved by a prolonged duration of the reaction or, more advantageously, by a 15 hours' heating at about 100° C. The excess ethyl bromide is evaporated and the residue is crystallized from a mixture consisting of absolute alcohol and ether. The salt melts at 240° C. with decomposition. The yield amounts to 2.1 grams (84% of the theoretical yield).

EXAMPLE 15

*5 - diethylaminoacetylamino - 2,3 - diphenyl - 1,4 - dioxo-tetrahydrophthalazine*

50 grams of 5-amino-2,3-diphenyl-1,4-dioxo-tetrahydrophthalazine are slowly heated to 40° C. together with 250 cc. of chloroacetylchloride. When the evolution of hydrogen chloride which, at the beginning, is rather vigorous, has diminished, the chloroacetylchloride in excess is removed under reduced pressure. The residue is dried at 100° C. In a quantitative yield a chloroacetyl derivatives is obtained which melts at 184°–187° C. When recrystallized from acetic acid ethyl ester the melting point rises to 190°–192° C.

30 grams of this chloroacetyl-derivative (0.0742 mol) are suspended with 80 grams of anhydrous pulverized potassium carbonate in 350 cc. of dry acetone. 9 grams of dry diethylamine (0.123 mol) are added, and the whole is heated for 8 hours under reflux. Subsequently the solvent is distilled off. The residue is taken up with acetic acid ethyl ester and shaken out three times with 100 cc. of 1 N–HCl each time. The combined acid extracts are rendered alkaline by means of sodium carbonate and shaken out with acetic acid ethyl ester. The acetic acid ethyl ester phase washed and dried by means of sodium sulfate after concentration by evaporation results in 25 grams of a pure basic ester melting at 156°–157° C. (76% of the theoretical yield).

EXAMPLE 16

*5-diethylaminoacetoxy-2,3-diphenyl-1,4-dioxo-tetrahydrophthalazine*

102 grams of 5-hydroxy-2,3-diphenyl-1,4-dioxo-tetrahydrophthalazine (0.309 mol) are dissolved in 339 cc. of absolute pyridine and mixed in portions, while stirring and cooling, with 77 grams of diethylamino-acetylchloride-hydrochloride (0.414 mol). The temperature is not allowed to exceed 28–30° C. After a two hours' stirring at room temperature the reaction product starts crystallizing out. It is then stirred for further 18 hours and vigorously filtered with suction. The crystallization product obtained is freed from pyridine in the desiccator over concentrated sulfuric acid, then dissolved in 1.5 l. of dry methylene chloride, shaken with animal charcoal, filtered and concentrated to about 200 cc. By addition of 500 cc. of absolute ether the hydrochloride precipitates in a crystallized state. In order to be purified it is recrystallized from absolute alcohol. Yield: 62 grams of a decomposition point of 116°–118° C. (with evolution of gas).

The pyridine mother liquors of the hydrochloride obtained as described above are suitably treated to obtain the basic ester. The pyridine is evaporated under reduced pressure, the dark brown residue is taken up with methylene chloride, the whole is shaken with animal charcoal, filtered and extracted in the separation funnel three times with 300 cc. of water each time. The aqueous extract is rapidly washed with ether and rendered alkaline by dropwise adding a sodium carbonate solution of 10% strength. The freed basic ester is extracted by a three times' shaking out with 250 cc. of ether each time. The combined ether extracts are washed with water, dried by means of sodium sulfate, concentrated by evaporation and recrystallized from a mixture of benzene and petroleum ether. Yield: 19 grams of ester melting at 129°–131° C.

The mother liquors obtained in the crystallization of the hydrochloride and the basic ester can be further treated in order to obtain 5-hydroxy-2,3-diphenyl-1,4-dioxo-tetrahydrophthalazine. The solvent is removed under reduced pressure, the residue is triturated by means of 500 cc. of water, and the suspension is rendered alkaline by means of sodium carbonate solution. The mass having been allowed to stand for 1 hour is acidified by means of 2 N-hydrochloric acid and filtered with suction. After drying 14 grams of starting material are recovered having a melting point of 186° C.–188° C. The total yield of basic ester and its hydrochloride referred to reacted 5 - hydroxy - 2,3 - diphenyl - 1,4 - dioxo - tetrahydrophthalazine, amounts to 64%.

EXAMPLE 17

*5-diethylaminoacetoxy-2,3-diphenyl-1,4-dioxo-tetra-hydrophthalazine-bromo-ethylate*

15 grams of 5-diethylaminoacetoxy-2,3-diphenyl-1,4-dioxo-tetrahydrophthalazine (obtained according to the directions given in Example 16) are dissolved in 100 cc. of distilled ethyl-bromide and allowed to stand for 5 days in a sealed vessel at room temperature. Then the quaternary salt crystallized out is separated off (yield of dry substance 10 grams). The mass is recrystallized from isopropyl alcohol and 7 grams of substance of the decomposition point of 168° C. are obtained (with evolution of gas).

After having been allowed to stand for a prolonged time or when boiled under reflux the ethyl bromide-mother liquors yield further crystal fractions of the quaternary salt.

EXAMPLE 18

*5-acrylyloxy-2,3-diphenyl-1,4-dioxo-tetrahydrophthalazine*

8.9 grams of acrylic acid chloride (1/10 mol) are added, while stirring, to a suspension of 35.2 grams of the sodium compound of 5-hydroxy-2,3-diphenyl-1,4-dioxo-tetrahydrophthalazine (1/10 mol) in 300 cc. of absolute toluene, and the reaction mixture is heated under reflux, while stirring, in the absence of moisture, for 3 hours to 60°–65° C., then filtered with suction from the separated sodium chloride and the mother liquors are concentrated under reduced pressure to 150 cc. On cooling, 26.9 grams of the ester melting at 193°–194° C. crystallize out (70% of the theoretical yield).

EXAMPLE 19

*5-stearyloxy-2,3-diphenyl-1,4-dioxo-tetrahydrophthalazine*

105.6 grams of the sodium compound of 5-hydroxy-2,3-diphenyl-1,4-dioxo-tetrahydrophthalazine (0.3 mol) are suspended in 700 cc. of dry methylene chloride, while stirring, and mixed with 99.7 grams of stearic acid chloride (0.33 mol). The temperature is raised by 10° C. The mass is heated for two further hours under reflux in the absence of moisture. Then the mass is filtered with suction from the sodium chloride and concentrated by evaporation until a sirupy consistency is obtained. The residue is boiled out with 2.5 liters of absolute ether. The solution is filtered while being hot, through a glass filter having a suitable width of the pores. While cooling, 71 grams of crystalline stearic acid ester melting at 80°–82° C. are separated off. An opalescent turbidity in the melt disappears only at 90° C. A further 30 grams of the compound having the same melting point can be crystallized from the mother liquors by concentration to 500 cc. Gross yield: 57%.

The substance still contains traces of 5-hydroxy-2,3-diphenyl-1,4-dioxo-tetrahydrophthalazine which can be separated by repeated crystallization from absolute ether. The substance melts at 80°–82° C. for form a completely clear solution. The ester is well soluble in olive oil, oleic acid ethyl ester etc.

EXAMPLE 20

5-oleyloxy-2,3-diphenyl-1,4-dioxo tetrahydrophthalazine 35.2 grams of the sodium compound of 5-hydroxy-2,3-diphenyl-1,4-dioxo-tetrahydrophthalazine (0.1 mol) are suspended, while stirring, in 300 cc. of dry methylene chloride. Then 33 grams of oleic acid chloride (0.11 mol), dissolved in 100 cc. dry methylene chloride, are added, while permanently stirring. The temperature is raised by 10° C. The mass is heated for 2 hours under reflux and in the absence of moisture, after cooling filtered with suction, and the solvent is removed under reduced pressure. The evaporation residue is vaporized twice under reduced pressure, each time by means of 200 cc. of absolute pseudocumene in order to remove non-reacted oleic acid chloride, as the latter would disadvantageously affect the crystallization of the ester. The residue is crystallized from absolute cyclohexane. There are obtained yellowish, lustrous, semi-solid crystal leaflets which are suitably centrifuged off. The mass is first dried on clay, then under highly reduced pressure and 25 grams of oleic acid ester melting at 69°–70° C. are obtained (42% of the theoretical yield). The purification is carried out better by crystallization from a mixture of methanol and water. In this case the melting point is in the range between 71° and 73° C. The ester is easily soluble in oleic acid ethyl ester as well as in other solvents for fat.

We claim:

1. The compound of the formula

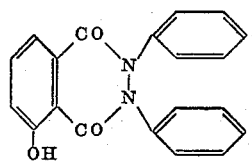

2. The compound of the formula

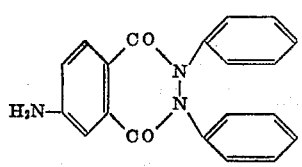

3. The compound of the formula

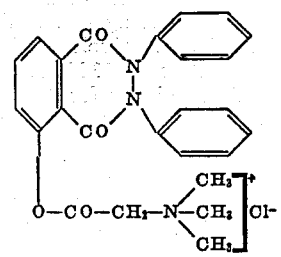

4. The compound of the formula

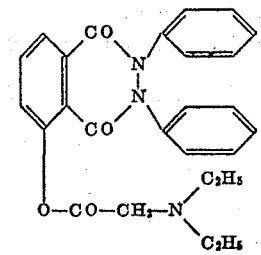

5. The compound of the formula

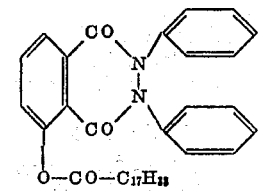

6. The process of preparing a 2,3-diphenyl-1,4-dioxo-tetrahydrophthalazine of the general formula

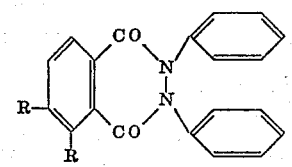

wherein one R is hydrogen and the other R is hydroxy, which comprises heating hydrazobenzene with a phthalic anhydride of the general formula

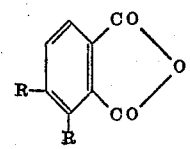

in the presence of a tertiary organic amine selected from the group consisting of dimethylaniline and pyridine as solvent.

7. A 2,3-diphenyl-1,4-dioxotetrahydrophthalazine of the general formula

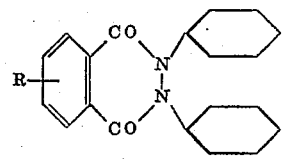

wherein R is a member selected from the group consisting of hydroxy, amino, diethylaminoacetylamino, the acyloxy groups dimethylaminoacetoxy, diethylaminoacetoxy, nicotinoyloxy, acryloxy, stearyloxy and oleyloxy groups, and the chloro- and bromomethylates and ethylates, methiodides and methyl-methylsulfates of said acyloxy groups.

No references cited.